(12) United States Patent
Davis

(10) Patent No.: US 12,528,618 B1
(45) Date of Patent: Jan. 20, 2026

(54) SCROLL CONSOLE

(71) Applicant: Evan Moran Davis, Kansas City, MO (US)

(72) Inventor: Evan Moran Davis, Kansas City, MO (US)

( * ) Notice: Subject to any disclaimer, the term of this patent is extended or adjusted under 35 U.S.C. 154(b) by 57 days.

(21) Appl. No.: 18/230,026

(22) Filed: Aug. 3, 2023

Related U.S. Application Data

(63) Continuation of application No. 18/224,475, filed on Jul. 20, 2023, now abandoned.

(60) Provisional application No. 63/390,678, filed on Jul. 20, 2022.

(51) Int. Cl.
    *B65D 21/08* (2006.01)
    *B65D 85/672* (2006.01)

(52) U.S. Cl.
    CPC ......... *B65D 21/086* (2013.01); *B65D 85/672* (2013.01)

(58) Field of Classification Search
    CPC ...... B65D 21/086; B65D 85/672; G09F 11/21
    USPC ............................................ 40/518; 206/774
    See application file for complete search history.

(56) References Cited

U.S. PATENT DOCUMENTS

| | | | | |
|---|---|---|---|---|
| 213,771 A * | 4/1879 | Morris et al. | ............ | B41L 5/06 |
| | | | | 40/518 |
| 532,569 A * | 1/1895 | Leffingwell | ............ | B42D 19/00 |
| | | | | 40/518 |
| 669,682 A * | 3/1901 | Carver | .................... | G09F 11/29 |
| | | | | 40/518 |
| 729,029 A * | 5/1903 | Woodward | .............. | G09F 11/29 |
| | | | | 40/518 |
| 762,982 A * | 6/1904 | Brown | .................... | B42D 19/00 |
| | | | | 40/518 |
| 778,092 A * | 12/1904 | Willson | .................... | G09B 1/24 |
| | | | | 40/518 |
| 892,153 A * | 6/1908 | Harwood | ............... | B42D 19/00 |
| | | | | 40/518 |
| 1,708,479 A * | 4/1929 | Macdonald | ............. | G09F 11/29 |
| | | | | 40/518 |
| 1,714,650 A * | 5/1929 | Webb | ..................... | G09B 29/06 |
| | | | | 40/518 |
| 1,729,480 A * | 9/1929 | Hale | ...................... | B42D 19/00 |
| | | | | 40/518 |
| 1,980,659 A * | 11/1934 | Boldt | ..................... | B42D 19/00 |
| | | | | 40/518 |
| 2,045,249 A * | 6/1936 | Petersen | .................. | G09F 11/29 |
| | | | | 40/518 |
| 2,485,802 A * | 10/1949 | Asachika | ............... | A45C 15/00 |
| | | | | 40/518 |
| 2,538,783 A * | 1/1951 | Holway | .................. | B43L 5/025 |
| | | | | 40/518 |
| 2,546,483 A * | 3/1951 | Venters | ................... | H04M 1/21 |
| | | | | 40/337 |

(Continued)

*Primary Examiner* — Ernesto A Grano
(74) *Attorney, Agent, or Firm* — Kutak Rock LLP; Eric S. Endsley

(57) ABSTRACT

A scroll console is provided. More specifically, the present invention is concerned with printed media and a device adapted for viewing said printed media in a continuous horizontal or vertical format. The scroll console further being configured to move from a closed configuration to an open configuration, wherein the closed configuration is adapted for transporting and storing printed media in the form of a scroll. Moreover, in the open position, the scroll console enables users to view the printed media in a continuous horizontal or vertical format.

29 Claims, 3 Drawing Sheets

Console in-use

(56) References Cited

U.S. PATENT DOCUMENTS

| | | | | |
|---|---|---|---|---|
| 2,680,628 | A * | 6/1954 | Berman | A44B 15/005 |
| | | | | 281/51 |
| 2,691,535 | A * | 10/1954 | Schell | A45C 15/02 |
| | | | | 281/6 |
| 2,952,931 | A * | 9/1960 | Manduca | A47B 97/02 |
| | | | | 40/518 |
| 3,829,997 | A * | 8/1974 | Singer | G09F 11/295 |
| | | | | 40/518 |
| 3,928,926 | A * | 12/1975 | Carriveau | G09B 1/24 |
| | | | | 40/518 |
| 4,083,136 | A * | 4/1978 | Zelenko | B42D 19/00 |
| | | | | 40/518 |
| 4,178,709 | A * | 12/1979 | Ford | B43L 13/14 |
| | | | | 40/503 |
| 4,277,033 | A * | 7/1981 | Swenson | B42D 19/00 |
| | | | | 40/518 |
| 4,310,977 | A * | 1/1982 | Swenson | G09F 11/29 |
| | | | | 40/518 |
| 4,824,140 | A * | 4/1989 | Rankin | B43L 3/008 |
| | | | | 40/518 |
| 5,068,988 | A * | 12/1991 | Mason | G09F 11/29 |
| | | | | 40/518 |
| 5,410,830 | A * | 5/1995 | Aiken, Sr. | G09F 11/18 |
| | | | | 40/518 |
| 5,515,631 | A * | 5/1996 | Nardy | G09F 11/21 |
| | | | | 40/518 |
| 5,918,395 | A * | 7/1999 | Hesmer | G09F 11/21 |
| | | | | 40/518 |
| D520,060 | S * | 5/2006 | Kato | D19/113 |
| 7,101,184 | B2 * | 9/2006 | Kirchhoff | G09B 11/00 |
| | | | | 434/85 |
| 9,104,370 | B2 * | 8/2015 | Hagan | G06F 1/163 |
| 9,823,697 | B2 * | 11/2017 | Hsu | G06F 1/1624 |
| 10,384,109 | B2 * | 8/2019 | Moran | F41J 1/00 |
| 11,056,025 | B2 * | 7/2021 | Lee | G06F 3/147 |
| D931,368 | S * | 9/2021 | McPhaul | D19/89 |
| 12,177,994 | B2 * | 12/2024 | Valeriy | H04M 1/0235 |
| 2003/0172564 | A1 * | 9/2003 | Perry | G09F 11/29 |
| | | | | 40/518 |
| 2005/0041012 | A1 * | 2/2005 | Daniel | G09F 9/301 |
| | | | | 345/156 |
| 2006/0090383 | A1 * | 5/2006 | Conner | G09F 11/18 |
| | | | | 40/518 |
| 2008/0308666 | A1 * | 12/2008 | Cowdrey | G09F 11/21 |
| | | | | 242/528 |
| 2015/0029229 | A1 * | 1/2015 | Voutsas | G06F 1/1647 |
| | | | | 345/1.3 |
| 2016/0255979 | A1 * | 9/2016 | Brinegar | A47G 33/08 |
| 2019/0143188 | A1 * | 5/2019 | Moran | A63B 69/331 |
| | | | | 482/83 |

* cited by examiner (1) Console
(2) Scroll
(3) Scroll Case

Console in-use

Exploded axonometric of components
(See text for descriptions)

SCROLL CONSOLE

CROSS-REFERENCE TO RELATED APPLICATIONS

This application is a continuation application of co-pending U.S. patent application Ser. No. 18/224,475, filed Jul. 20, 2023, which claims priority pursuant to 35 U.S.C. 119 (e) to U.S. Provisional Patent Application Ser. No. 63/390,678, filed Jul. 20, 2022, the entire disclosures of which are incorporated herein by reference.

FIELD OF THE INVENTION

The present invention relates generally to a scroll console. More specifically, the present invention is concerned with printed media and a device adapted for viewing said printed media in a continuous horizontal or vertical format.

BACKGROUND

Since the advent of books and newspapers and continuing throughout today's ever changing digital age, the type of media utilized for the forgoing and for items such as maps, magazines, publications, comic books, or the like, has mirrored the evolution of human society over the centuries. As such, over the years and in efforts to continuously improve upon the current situation of preferred media, humans have strived to enhance the type of media congruently along with the current state of innovation. However, while this journey from traditional paper to complex digital signals was necessitated by industry and society, there exist a need for a system and method that bridges the gaps between physical and digital media.

Traditionally, physical paper was the gold standard for all things print. From scrolls and documents to books, newspapers, and much more, paper-based products have certainly withstood the test of time. However, each of the forgoing uses, along with many not mentioned, present traditional modes and methods of paper-based media with obstacles that have yet to be resolved. A significant disadvantage to traditional paper-based media is that in large quantities, such as books comprising hundreds of pages, the total weight and size can quickly accumulate and become significant factor impacting transportability. Accordingly, it would be beneficial to have a system for and method that is capable of presenting various volumes of media and also remains easily portable.

Another disadvantage to physical print media is that it, depending on its form (e.g., books or prints) paper-products are somewhat fragile and vulnerable to damage. For example, often times when paper-based media is subjected to moisture or water, the paper-based media, along with its content, is either damaged or wholly destroyed. Accordingly, it would be beneficial to have a system for and method that protects physical print-based media from various types of damage.

Another significant disadvantage to traditional physical print media, such as books, is that viewing the paper-based media is limited to either horizontal or vertical printing constraints. For example, the viewable content on the pages of a book is limited to the horizontal area and, in order to maintain resolution, images are often printed on multiple pages and the user is not able to see a continuous image. Accordingly, it would be beneficial to have a system for and method that presents physical media in a continuous horizontal or vertical viewing format.

Unlike traditional paper-based media, digital media is transmitted, archived, compiled, translated, and analyzed in the form of digital data. The most prevalent forms of traditional digital media include digital signals in the translated into the form of audio, video, graphics, text, or the like, and have been widely utilized since the advent of the digital age. However, while this digital data certainly has its place in everyday life, it also certainly has its uniquely associated inadequacies. Moreover, the digital devices required to translate this digital data, not only suffers from the same problems as does digital media, they also to are susceptible to a variety of issues. Accordingly, it would be beneficial to have a system for and method that overcomes the forging issues related to, or associated with, traditional digital media, devices required for viewing the digital media, and issues related, but not limited, to limitations associated with traditional paper-based media and the modes of displaying, reading, transporting, archiving, and/or viewing paper-based media.

A significant disadvantage with digital media is related to the storage and archival of digital media. Some challenges related to the forgoing include the preservation of data by preventing or mitigating data loss, limited file formats, and fragility of storage media. Additionally, due to the rapid evolution of technology, the type or format of the digital data may become obsolete and unusable. Accordingly, it would be beneficial to have a system for and method of easily transporting media while protecting the media from corruption, damage, or data loss, or loss of viewability.

Another significant disadvantage with digital media is the transmission storage of digital signals is often subject to corruption during transmission or transportation of such digital media. During transportation digital media can be reconstructed and is subject to data loss. Accordingly, it would be beneficial to have a system for and method of easily transporting media while protecting the media from corruption, damage, or data loss.

Yet another significate disadvantage with traditional digital media is that, specifically pertaining to sources of revenue, digital media is limited with respect to its revenue format or model due to existing revenue streams. For example, if digital media is not sold directly to the user and perhaps the content is not suitable for publishing in a printed book format, existing systems and methods generate income from sources such as digital advertisement or crowd-based financing. Accordingly, it would be beneficial to have a system for and method of generating alternative models for generating revenue by enabling authors, publishers, artist, or the like, the option of selling their work in a paper format.

Under the realm of digital media, there exist numerous styles of electronic devices being specially adapted for reading text, viewing images, and storing digital information. Some examples of these types of devices include, computers, tablets, and a vast array of other types of electronic user interfaces. Moreover, in some industries or markets, there exists a common push to employ paperless digital processes that completely replaces physical paper, books, prints, and/or among other types of uses that was traditionally reserved for print or paper. However, often, in this digital format, challenges arise that fail in comparison or in preference when it comes to comparison with its paper-based counterpart.

As a result, existing digital platforms, digital media, existing modes of viewing physical media, and existing physical media do not meet the needs of users for a mobile device that provides for the transport, reading, and archival of literature printed in a continuous horizontal or vertical format.

SUMMARY

In one aspect, the present invention comprises a scroll console. In some embodiments, the scroll console is a mobile or portable device adapted to enable a user to view media, such as printed media, in a format such as a paper scroll. In other embodiments, the scroll console enables users to view or read other type of media comprised in rolls, rolled paper, or paper like material in a rolled form.

In various embodiments, the scroll console includes a scroll console, a scroll, and a scroll case. In some embodiments, the scroll console includes two asymmetrical open-ended boxes. In a preferred embodiment, the two asymmetrical open-ended boxes are configured to be affixed to a telescoping backplate. In some embodiments of the present invention, the two asymmetrical open-ended boxes include an opening wherein media, such as a scroll, can be inserted into the scroll console. In another embodiment, the scroll console includes mechanisms adapted to rotate the scrolls components such that the inserted media is moved (e.g., scrolled) through the scroll console. Yet in another embodiment of the instant invention, mechanisms adapted to rotate the scrolls are affixed to pegs, wherein the pegs are removably affixed to the media. In some embodiments, the scroll console includes controls, wherein the user utilizes the controls to view the media on the scroll console. In some embodiments, the media is a scroll. In other embodiments, the media is a continuous sheet of printable material and bound to a hollow rod at each end. In some embodiments, the present invention includes a scroll case. In a preferred embodiment, the scroll case is an open-ended container with a securable cap.

In various embodiments, the scroll console is a mobile device that is capable of presenting various volumes of media and also remains easily portable. In various embodiments, the scroll console protects printed medial, such as printed literature, webcomic, or scroll, from physical damage. In some embodiments, the scroll console is made from a plastic material and is water resistant, which provides suitable protection for print-based media from various types of damage. In other embodiments, the scroll console is made from other types of material, that provides structural protection for the media and is also water or moisture resistant. In various embodiments, the scroll console provides a system for and method that presents physical media in a continuous horizontal or vertical viewing format.

In various embodiments, the scroll console provides a system for and method that overcomes the forging issues related to, or associated with, traditional digital media, devices required for viewing the digital media, and issues related, but not limited, to limitations associated with traditional paper-based media and the modes of displaying, reading, transporting, archiving, and/or viewing paper-based media. In some embodiments, the scroll console provides a system for and method of easily transporting media while protecting the media from corruption, damage, or data loss. In various embodiments, the scroll console provides alternative models for generating revenue by enabling authors, publishers, artist, or the like the option of selling their work in a paper format.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION

Embodiments of the present invention are described in detail below with reference to the attached drawing figures, wherein.

Figure 1:
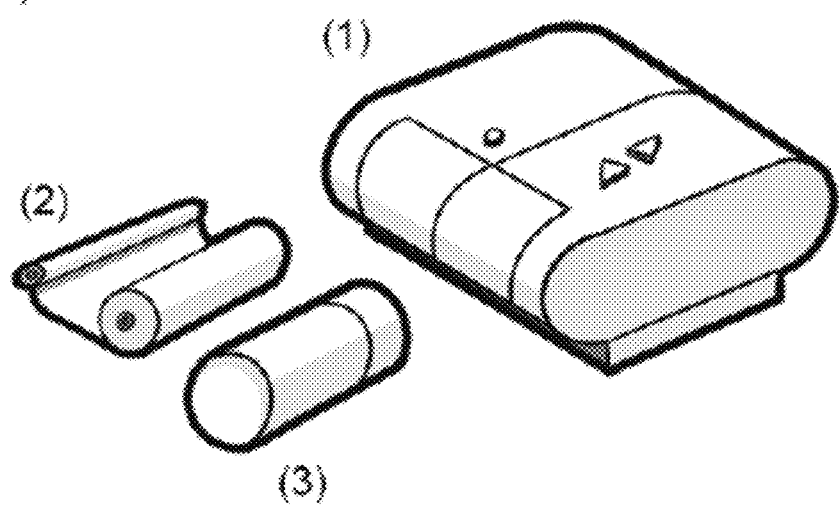
FIG. 1 is a perspective view of a scroll console embodying the present invention, the scroll console shown in a closed configuration.

The drawing figures do not limit the present invention to the specific embodiments disclosed and described herein. The drawings are not necessarily to scale, emphasis instead being placed upon illustrating the principles of the invention.

DETAILED DESCRIPTION

As required, a detailed embodiment of the present invention is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 2:
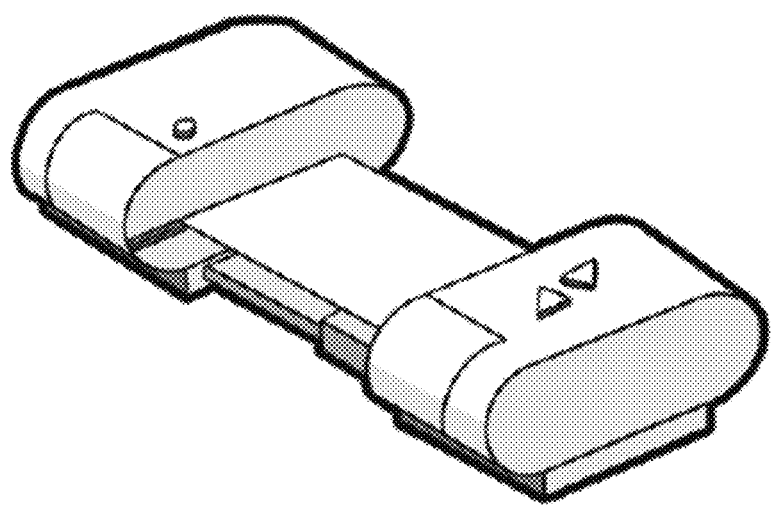
FIG. 2 is a perspective view of a scroll console embodying the present invention, the scroll console shown in an open configuration.

Referring to FIGS. 1 and 2, the present invention discloses a scroll console 1, a scroll 2, and a scroll case 3, and method for the transport, reading, and archival of literature printed in a continuous horizontal or vertical format.

Still refereeing to FIGS. 1 and 2, the present invention discloses a scroll console 1 being configured to move from a first configuration to a second configuration. In one embodiment, FIG. 1 disclosed a scroll console 1 in a first configuration. In a preferred embodiment, the first configuration is a closed configuration. In another embodiment, the first configuration is a transporting and/or storage configuration. In another embodiment, FIG. 2 shows the scroll console 1 in a second configuration. In some embodiments, the second configuration is an open configuration. In other embodiments, the second configuration is a viewing and/or reading configuration. In a preferred embodiment, the scroll console 1 moves from a first configuration to a second configuration. In other embodiments, the scroll console 1 moves from a second configuration to a first configuration.

In an exemplary embodiment, the scroll console 1 includes a first asymmetrical open-end box 1a. In a preferred embodiment, the first asymmetrical box 1a includes an opening 1a1, an exterior side 1a3, an interior side 1a6, a top portion 1a7, and a bottom portion 1a8. In some embodiments, the opening 1a1 receives a media, such as a scroll. In other embodiments, media, such as a scroll, is placed inside a cavity of the first asymmetrical box 1a. In another embodiment, opening 1a1 includes a door 1a9 pivotally affixed to the first asymmetrical box 1a. In some embodiments, the door 1a9 is movable from a first position to a second position. In some embodiments, the door's 1a9 first position is a closed position. In other embodiments, the door's 1a9 second position is an open position. In a preferred embodiment, the first asymmetrical box 1a includes an end portion 1a5 being specially adapted to receive a first scrolling mechanism 1a2. In some embodiments, the first scrolling mechanism 1a2 is removably attached to the first asymmetrical open-end box 1a1. In other embodiments the first scrolling mechanism 1a2 is distal from opening 1a1. In some embodiments, the first asymmetrical box 1a includes a cutout or slit 1a4. In some embodiments, the slit 1a4 is configured to receive a portion of a scroll. In a preferred embodiment, a telescoping backplate 1c is removably affixed to a bottom surface 1a8 the first asymmetrical box 1a. In some embodiments, a telescoping backplate 1c is affixed to a bottom surface 1a8 the first asymmetrical box 1a.

In some embodiments, the scroll console includes a second asymmetrical open-end box 1b. In a preferred embodiment, the second asymmetrical box 1b includes an opening 1b1, an exterior side 1b3, an interior side 1b6, a top portion 1b7, and a bottom portion 1b8. In some embodiments, the opening 1b1 receives a media, such as a scroll. In another embodiment, opening 1b1 includes a door 1b9 pivotally affixed to the second asymmetrical box 1b. In other embodiments, media, such as a scroll, is placed inside a cavity of the second asymmetrical box 1b. In some embodiments, the door 1b9 is movable from a first position to a second position. In some embodiments, the door's 1b9 first position is a closed position. In other embodiments, the door's 1b9 second position is an open position. In a preferred embodiment, the second asymmetrical box 1b includes an end portion 1b5 being specially adapted to receive a second scrolling mechanism 1b2. In some embodiments, the second scrolling mechanism 1b2 is removably attached to the second asymmetrical open-end box 1b1. In other embodiments the second scrolling mechanism 1b2 is distal from opening 1b1. In some embodiments, the second asymmetrical box 1b includes a cutout or slit 1b4. In some embodiments, the slit 1b4 is configured to receive a portion of a scroll. In a preferred embodiment, a telescoping backplate 1c is removably affixed to a bottom surface 1b8 the second asymmetrical box 1b. In some embodiments, a telescoping backplate 1c is affixed to a bottom surface 1b8 the first asymmetrical box 1b.

Figure 3:
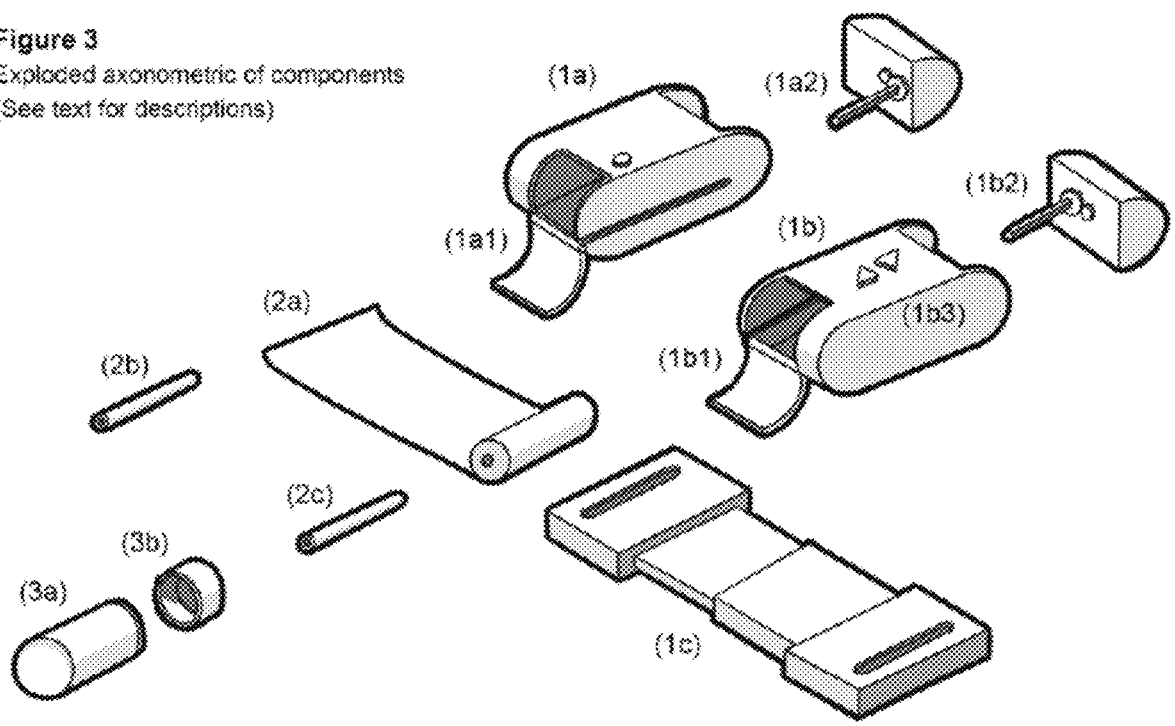
FIG. 3 is a perspective view of a scroll console embodying the present invention, the scroll console shown in an exploded view.

In some embodiments, the first scrolling mechanism 1a2 includes a mechanism for rotating a peg 1a10. In some embodiments the first scrolling mechanism 1a2 includes a motor, such as an electric motor powered by a battery, for rotating the peg 1a10. In other embodiments the first scrolling mechanism 1a2 includes a plurality of gears which are manually rotated by a used and in turn rotates peg 1a10. As seen in FIG. 3 and in some embodiments, the peg 1a10 extends outwardly and away from the first scrolling mechanism 1a2. In other embodiments, the peg 1a10 is inserted into a cavity of the first asymmetrical box 1a. In another embodiment, the peg 1a10 receives a tube 2b. In a preferred embodiment, peg 1a10 is inserted into a cavity of the first asymmetrical box 1a before receiving tube 2b.

In some embodiments, the second scrolling mechanism 1b2 includes a mechanism for rotating a peg 1b10. In some embodiments the second scrolling mechanism 1b2 includes a motor, such as an electric motor powered by a battery, for rotating the peg 1b10. In other embodiments the second scrolling mechanism 1b2 includes a plurality of gears which are manually rotated by a used and in turn rotates peg 1b10. As seen in FIG. 3 and in some embodiments, the peg 1b10 extends outwardly and away from the second scrolling mechanism 1b2. In other embodiments, the peg 1b10 is inserted into a cavity of the second asymmetrical box 1b. In another embodiment, the peg 1b10 receives a tube 2c. In a preferred embodiment, peg 1b10 is inserted into a cavity of the second asymmetrical box 1b before receiving tube 2c.

In a preferred embodiment, the scroll console includes a telescoping backplate 1c. In some embodiments, the telescoping backplate 1c is removably affixed to a first asymmetrical box 1a. In some embodiments, the telescoping backplate 1c is removably affixed to a second asymmetrical box 1b. In other embodiments, the telescoping backplate 1c is removably affixed to both a first asymmetrical box 1a and a second asymmetrical box 1b. In some embodiments, the telescoping backplate 1c is movable from a first configuration to a second configuration. In some embodiments, the telescoping backplate 1c first configuration is a closed configuration. In some embodiments, the telescoping backplate 1c second configuration is an open configuration.

In some embodiments, the scroll console includes controls for moving a scroll from a beginning position to an end position. In some embodiments, the scroll console includes controls for moving a scroll from a first position to a second position. In some embodiments, the controls are electronic buttons and are adapted to electrically connect and/or control the first scrolling mechanism 1a2, the second scrolling mechanism 1b2, or both. In some embodiments, the controls include a plurality of gears being configured to translate a user's mechanical input to rotational force that in turn moves the scroll from a beginning position to an end position.

In a preferred embodiment, the media is a scroll, physical paper-based product, or the like. In another embodiment, the scroll console includes a media container 3a for storing or archiving the media while the media is not inserted into the scroll console. In some embodiments, the media container includes a cap 3b being removably affixed to an end portion off the media container 3a.

In an exemplary embodiment of the present invention and referring to FIG. 3, literature, images, or the like, is printed on a scroll 2a and a scroll first end is affixed in a rolled manner to rod 2b. In some embodiments, the first end of the scroll affixed to rod 2b is a scroll end position. In some embodiments, the first end of the scroll affixed to rod 2b is a scroll second position. In some embodiments, a second end of the scroll is affixed to rod 2c, wherein the second end of the scroll affixed to rod 2c is a scroll beginning position. In some embodiments, a second end of the scroll is affixed to rod 2c, wherein the second end of the scroll affixed to rod 2c is a scroll first position. In some embodiments, the scroll console is configured to move a scroll from a first position to a second position.

Referring to FIG. 3, to insert the scroll into the scroll console, the first and second doors (1a9 and 1b9 respectively) of the first and second asymmetrical open-end boxes (1a and 1b respectively) are moved from their closed configurations to their open configurations. In a preferred embodiment each scrolling mechanism is affixed to their respective asymmetrical open-end boxes, with corresponding pegs (1a10 and 1b10) being inserted into a cavity of corresponding asymmetrical open-end box (1a and 1b). Still referring to FIG. 3, scroll rods (2b and 2c) are slidably engaged with pegs (1a10 and 1b10) while the scroll is affixed to scroll rods (2b and 2c). As seen in FIG. 3, as scroll rods (2b and 2c) engage with pegs (1a10 and 1b10) a portion of the scroll is inserted into slots 1a4 and 1b4. In another preferred embodiment, scroll rods (2b and 2c) move from an unlocked position to a locked position when a scroll is installed into the scroll console. In some embodiments, rods (2b and 2c) are in the locked position when fully inserted on peg's (1a10 and 1b10). In another embodiment, rods (2b and 2c) are in a unlock locked position when partially inserted on peg's (1a10 and 1b10).

In some embodiments, a scroll is inserted into or removed from the scroll console while the scroll console is in a first configuration. In other embodiments, a scroll inserted into or removed from the scroll console while the scroll console is in a second configuration.

In some embodiments, literature is printed on scrolls 2a, rolled up, and protected in a scroll case 3. In some embodiments, a scroll is taken out of the scroll case 3a and inserted into the console 1, the scroll rods (2b, 2c) sliding over and locking onto the pegs (1a2, 1b2). In other embodiments, opening the console extends a telescopic backplate 1c and pulls the scroll taut for reading. In some embodiments, controls 1d on the console 1b3 cause the pegs inside to rotate and pull the scroll in one direction or the other, depending on the media being read. In an exemplary embodiment, closing the console 1 will save where the scroll was last read so it can be resumed at a later time.

In some embodiments, the scroll console includes two size options. In some embodiments, a first size is a standard size, wherein the standard size includes a 6"×6" reading area. In other embodiments, a second size is a universal size, wherein the universal size includes a 12"×12" reading area. In some embodiments, the scroll console includes a customizable console chassis and scroll case. In some embodiments, the scroll console includes a kickstand comprised on the telescoping backplate 1c. In some embodiments, the scroll console includes watertight interlocks. In some embodiments, the scroll console includes a reading light, such as an LED reading light. In some embodiments, the scroll console includes a rubber grip. In some embodiments, the scroll console includes a plurality of buttons such as a Next/Previous Page button, and/or a Fast Forward/Rewind button. In some embodiments, the scroll console includes a Water-retardant scroll paper. In some embodiments, the scroll console includes a scroll case with cylindrical base options, options such as a base having an overall shape corresponding to a square, a circle, or hexagonal.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, various embodiments of the present technology include a variety of combinations and/or integrations of the embodiments described herein.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall within the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

The invention claimed is:

1. A scroll console device comprising:
   a telescoping backplate, wherein the telescoping backplate is movable from a first configuration to a second configuration;
   a first open-end box, the first open-end box defining a cavity, and wherein a bottom portion of the first open-end box is affixed to a top surface of a first end of the telescoping backplate;
   a second open-end box, the second open-end box defining a cavity, and wherein a bottom portion of the second open-end box being affixed to the top surface of a second end of the telescoping backplate;
   a scrolling mechanism, the scrolling mechanism being affixed to an opening on a first end portion of the first open-end box, and wherein a portion of the scrolling mechanism extends into the cavity; and
   wherein the first open-end box comprises:
      a second opening, the second opening being positioned on a second end of the first open-end box, where the second opening is distal from the first opening, and wherein a door is pivotally affixed to a lower portion of the second opening, and
      a slit, the slit being positioned on an interior side of the first open-end box, wherein the slit extends from the second end of the first open-end box towards the first end portion of the first open-end box, and wherein the slit extends in a direction that is parallel with a top surface of the first open-end box.

2. The scroll console of claim 1, wherein the telescoping backplate first configuration is a closed configuration.

3. The scroll console of claim 1, wherein the telescoping backplate second configuration is an open configuration.

4. The scroll console of claim 1, wherein the second open-end box comprises:
- an opening on a first end portion, the opening being configured for receiving a second scrolling mechanism;
- a second opening, the second opening being positioned on a second end of the second open-end box, wherein the second opening is distal from the first opening, and wherein a door is pivotally affixed to a lower portion of the second opening; and
- a slit, the slit being positioned on an interior side of the second open-end box, wherein the slit extends from the second end of the second open-end box towards the first end portion of the second open-end box, and wherein the slit extends in a direction that is parallel with a top surface of the second open-end box.

5. The scroll console according to claim 4, wherein the second scrolling mechanism comprises a peg, the peg extending from the scrolling mechanism into the cavity.

6. The scroll console according to claim 5, wherein the peg further comprises an exterior surface being configured to engage with an interior surface of a second tube.

7. The scroll console according to claim 6, wherein the second scrolling mechanism includes a means for rotating the peg, wherein rotating the peg thereby rotates the second tube.

8. The scroll console of claim 1, wherein the scrolling mechanism comprises a peg, the peg extending from the scrolling mechanism into the cavity.

9. The scroll console according to claim 8, wherein the peg further comprises an exterior surface being configured to engage with an interior surface of a first tube.

10. The scroll console according to claim 9, wherein the first scrolling mechanism includes a means for rotating the peg, wherein rotating the peg thereby rotates the first tube.

11. A method of using a console to view a scroll, the method comprising:
- pivoting a first door towards an open position, thereby providing access to an internal cavity of a first open-end box;
- pivoting a second door towards an open position, thereby providing access to an internal cavity of a second open-end box;
- engaging a first scroll tube with a peg, the peg extending from a first scrolling mechanism into the cavity of the first open-end box;
- engaging a second scroll tube with a second peg, the second peg extending from a second scrolling mechanism into the cavity of the second open-end box;
- moving the scroll into the cavity of the first and second open-end boxes;
- moving the console from a closed configuration to an open configuration; and
- viewing a first surface of the scroll.

12. The method of claim 11, wherein the step of moving the scroll into the cavity of the first and second open-end boxes further comprises moving a portion of the scroll into a first and second slit.

13. The method of claim 12, wherein the first slit is positioned on an interior side of the first open-end box, wherein the slit extends from the second end of the first open-end box towards the first end portion of the first open-end box, and wherein the slit extends in a direction that is parallel with a top surface of the first open-end box.

14. The method of claim 12, wherein the second slit is positioned on an interior side of the second open-end box, wherein the slit extends from the second end of the second open-end box towards the first end portion of the second open-end box, and wherein the slit extends in a direction that is parallel with a top surface of the second open-end box.

15. The method of claim 12, the step of moving the scroll into the cavity of the first and second open-end boxes further comprises:
- moving the first door from the open position to a closed position; and
- moving the second door from the open position to a closed position.

16. The method of claim 11, the step of moving the console from a closed configuration to an open configuration comprises moving a telescoping backplane from a first position to a second position.

17. The method of claim 16, wherein moving the telescoping backplane from the first position to the second position causes an amount of the scroll to extend over a viewing surface of the telescoping backplane.

18. The method of claim 11, wherein the step of viewing the scroll comprises using controls to rotate the first peg, wherein rotating the first peg thereby rotates the first tube.

19. The method of claim 18, wherein the step of viewing the scroll comprises using controls to transfer an amount of the scroll from the first tube to the second tube.

20. A scroll console device comprising:
- a telescoping backplate, wherein the telescoping backplate is movable from a first configuration to a second configuration;
- a first open-end box, the first open-end box defining a cavity, and wherein a bottom portion of the first open-end box is affixed to a top surface of a first end of the telescoping backplate;
- a second open-end box, the second open-end box defining a cavity, and wherein a bottom portion of the second open-end box being affixed to the top surface of a second end of the telescoping backplate;
- a scrolling mechanism, the scrolling mechanism being affixed to an opening on a first end portion of the first open-end box, and wherein a portion of the scrolling mechanism extends into the cavity; and
- wherein the second open-end box comprises:
  - an opening on a first end portion, the opening being configured for receiving a second scrolling mechanism;
  - a second opening, the second opening being positioned on a second end of the second open-end box, wherein the second opening is distal from the first opening, and wherein a door is pivotally affixed to a lower portion of the second opening; and
  - a slit, the slit being positioned on an interior side of the second open-end box, wherein the slit extends from the second end of the second open-end box towards the first end portion of the second open-end box, and wherein the slit extends in a direction that is parallel with a top surface of the second open-end box.

21. The scroll console of claim 20, wherein the telescoping backplate first configuration is a closed configuration.

22. The scroll console of claim 20, wherein the telescoping backplate second configuration is an open configuration.

23. The scroll console of claim 20, wherein the first open-end box comprises:
- a second opening, the second opening being positioned on a second end of the first open-end box, wherein the second opening is distal from the first opening, and wherein a door is pivotally affixed to a lower portion of the second opening; and
- a slit, the slit being positioned on an interior side of the first open-end box, wherein the slit extends from the second end of the first open-end box towards the first end portion of the first open-end box, and wherein the slit extends in a direction that is parallel with a top surface of the first open-end box.

24. The scroll console of claim 20, wherein the scrolling mechanism comprises a peg, the peg extending from the scrolling mechanism into the cavity.

25. The scroll console according to claim 24, wherein the peg further comprises an exterior surface being configured to engage with an interior surface of a first tube.

26. The scroll console according to claim 25, wherein the first scrolling mechanism includes a means for rotating the peg, wherein rotating the peg thereby rotates the first tube.

27. The scroll console according to claim 20, wherein the second scrolling mechanism comprises a peg, the peg extending from the scrolling mechanism into the cavity.

28. The scroll console according to claim 27, wherein the peg further comprises an exterior surface being configured to engage with an interior surface of a second tube.

29. The scroll console according to claim 28, wherein the second scrolling mechanism includes a means for rotating the peg, wherein rotating the peg thereby rotates the second tube.

\* \* \* \* \*